United States Patent
Ma

(10) Patent No.: US 12,407,957 B1
(45) Date of Patent: Sep. 2, 2025

(54) MULTIPLE-SUBSTRATE HIGH CONVERSION GAIN PIXELS

(71) Applicant: Apple Inc., Cupertino, CA (US)

(72) Inventor: Jiaju Ma, Monrovia, CA (US)

(73) Assignee: Apple Inc., Cupertino, CA (US)

( * ) Notice: Subject to any disclaimer, the term of this patent is extended or adjusted under 35 U.S.C. 154(b) by 118 days.

(21) Appl. No.: 18/510,547

(22) Filed: Nov. 15, 2023

Related U.S. Application Data

(60) Provisional application No. 63/476,935, filed on Dec. 22, 2022.

(51) Int. Cl.
*H04N 25/77* (2023.01)
*H04N 25/78* (2023.01)

(52) U.S. Cl.
CPC ............ *H04N 25/77* (2023.01); *H04N 25/78* (2023.01)

(58) Field of Classification Search
CPC .............................. H04N 25/77; H04N 25/78
USPC ......................................................... 348/308
See application file for complete search history.

(56) References Cited

U.S. PATENT DOCUMENTS

| | | | | |
|---|---|---|---|---|
| 8,878,267 | B2 * | 11/2014 | Inui | H10F 39/026 257/292 |
| 9,225,922 | B2 | 12/2015 | Lee et al. | |
| 10,110,839 | B2 | 10/2018 | Mlinar et al. | |
| 10,950,640 | B2 * | 3/2021 | Jin | H10F 39/8027 |
| 11,665,443 | B2 * | 5/2023 | Oh | H04N 25/62 348/308 |
| 11,776,974 | B2 * | 10/2023 | Sekine | H04N 25/78 348/308 |
| 11,973,102 | B2 * | 4/2024 | Tojinbara | H10F 39/811 |
| 12,058,455 | B2 * | 8/2024 | Kurihara | H04N 25/778 |
| 2020/0286938 | A1 * | 9/2020 | Jin | H10F 39/803 |
| 2022/0086375 | A1 | 3/2022 | Yang et al. | |
| 2022/0239853 | A1 * | 7/2022 | Kurihara | H10F 39/811 |
| 2022/0272289 | A1 * | 8/2022 | Oh | H04N 25/585 |
| 2022/0367539 | A1 * | 11/2022 | Mori | H10F 39/196 |
| 2022/0367558 | A1 * | 11/2022 | Fujii | H10F 39/024 |
| 2022/0384207 | A1 * | 12/2022 | Haneda | H01L 21/3205 |
| 2022/0392942 | A1 * | 12/2022 | Tojinbara | H04N 25/79 |
| 2024/0055445 | A1 * | 2/2024 | Goto | H10F 39/80373 |

\* cited by examiner

*Primary Examiner* — Pritham D Prabhakher
(74) *Attorney, Agent, or Firm* — Robert C. Kowert; Kowert, Hood, Munyon, Rankin & Goetzel, P.C.

(57) ABSTRACT

An image sensor may include a plurality of light-gathering pixels and a plurality of substrates. The pixels may each comprise at least one photodiode, a floating diffusion node, and a pixel readout circuit. The pixel readout circuit may include a plurality of transistors, which may be controlled to transfer electrical charge out of the photodiode through the floating diffusion node to generate an analog signal at an output. The pixels may be formed or fabricated on or within the substrates such that for each pixel, a first substrate may include the photodiode, floating diffusion node, and a first subset of the transistors of the pixel readout circuit that is electrically connected with the floating diffusion node directly, and one or more other substrates may include at a second subset of the transistors that is electrically connected with the floating diffusion node indirectly.

20 Claims, 7 Drawing Sheets

MULTIPLE-SUBSTRATE HIGH CONVERSION GAIN PIXELS

This application claims benefit of priority to U.S. Provisional Application Ser. No. 63/476,935, entitled "Multiple-Substrate High Conversion Gain Pixels," filed Dec. 22, 2022, and which is hereby incorporated herein by reference in its entirety.

BACKGROUND

Technical Field

This disclosure relates generally to an image sensor and more specifically to design of an image sensor to realize a high conversion gain.

Description of the Related Art

Image capturing devices, such as cameras, are widely used in various electronic devices, such as mobile devices (e.g., smart phones, tablets, laptops, etc.), robotic equipment, or security monitoring devices, among others. An image capturing device may include an image sensor having a plurality of light-gathering pixels. The image capturing device may capture light from an environment and pass the light to the image sensor. When exposed to light, photodiodes of the pixels may accumulate electrical charge, such as photoelectrons. The electrical charge may be transferred out of the photodiodes to generate analog image signals at one or more outputs. Through the outputs, the analog image signals may be obtained and converted to digital image signals, which may be further processed to generate images. Sometimes, it is desirable for the image sensor to have a high conversion gain. A sensor conversion gain represents the ratio between the number of photoelectrons and the values of the sensor digital image signals. A high conversion gain means larger digital image signals for a given number of electron charge. A high conversion gain can boost the sensor digital image signals in low light conditions and increase the signal-to-noise ratio (SNR), which may lead to improvement of the quality of captured images. Thus, it is desirable to design an image sensor to realize a high conversion gain.

Figure 1:
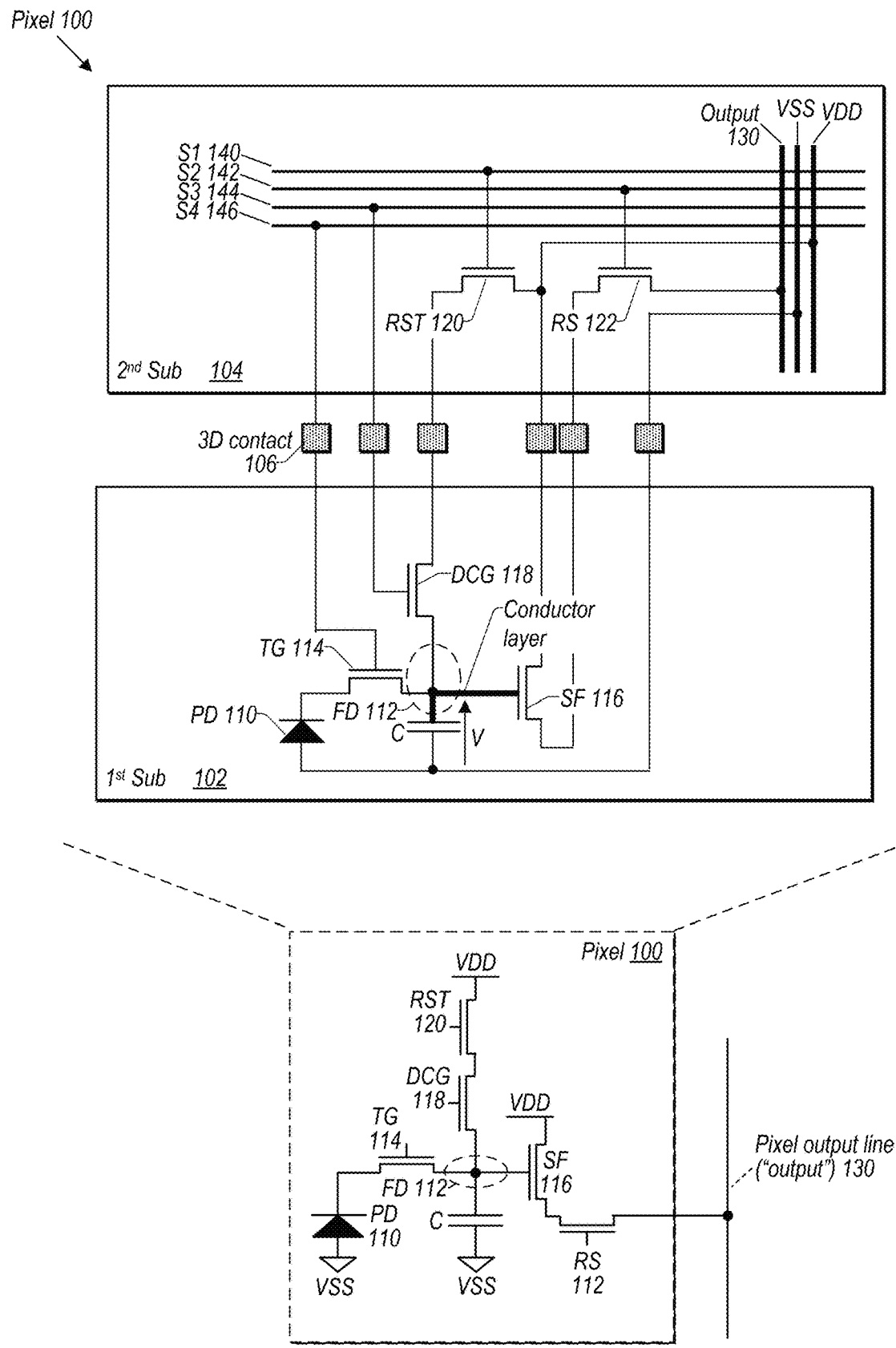
FIG. 1 is a diagram showing example components of an individual pixel of an image sensor formed or fabricated on or within a plurality of substrates, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Various embodiments described herein relate to an image sensor having a plurality of substrates to realize a high sensor conversion gain. In some embodiments, the image sensor may include a plurality of light-gathering pixels. For at least some pixels, each may include at least one photodiode (hereinafter "PD"), a floating diffusion node (hereinafter "FD"), and a pixel readout circuit. The PD may accumulate electrical charge, e.g., photoelectrons, when exposed to light. In some embodiments, the pixel readout circuit may include a plurality of transistors. At readout of an individual pixel, the transistors may be controlled to cause the charge to transfer out of the PD through the FD to generate an analog image signal (e.g., an analog voltage) at a pixel output line (hereinafter "output"). Through the output, the analog image signal may be obtained by an analog-to-digital converter, which may sample and convert the analog image signal to a digital image signal. After readout of the pixels of the image sensor, the digital image signals from the pixels may be transferred to one or more devices, e.g., an image signal processor (ISP). The ISP may further process the digital image signals to produce one or more images. In some embodiments, the image sensor may be part of an image capturing device, such as a camera, and the image capturing device may be part of an electronic device, such as a mobile device (e.g., a smart phone, tablet, laptop, etc.), robotic equipment, or a security monitoring device, among others.

In some embodiments, the image sensor may include a plurality of substrates to realize a high conversion gain. As described above, the conversion gain of an image sensor may represent the ratio between the number of photoelectrons and the values of the sensor digital image signals. In some embodiments, the conversion gain may be obtained by multiplying the gains of two conversion stages, such as the above described charge-to-analog image signals conversion and the analog image signals-to-digital image signals conversion. In some embodiments, the gain of the charge-to-analog image signals conversion of an individual pixel may substantially be inversely proportional to the total capacitance at the FD of the pixel. Thus, decrease of the FD capacitance may enlarge the conversion gain, whereas increase of the FD capacitance may lower the conversion gain. In some embodiments, the capacitance of the FD may include several capacitance components, e.g., the junction capacitor, overlap capacitance, source follower transistor gate capacitance, inter-metal parasitic capacitance, etc. As the pixel size shrinks when more pixels are included in an image sensor, the metal routing inside the pixels becomes very dense, and the inter-metal parasitic capacitance may become a significant portion of the total FD capacitance.

Thus, in some embodiments, to realize a high conversion gain, the above described components of individual pixels may be formed or fabricated on or within separate ones of the plurality of substrates to reduce the total FD capacitance. In particular, in some embodiments, the substrates may separate (a) a first subset of the transistors of the pixel readout circuit of a pixel, which is electrically connected with the FD of the pixel directly from (b) a second subset of the transistors of the pixel readout circuit of the pixel, which is electrically connected with the FD indirectly, e.g., via the first subset of the transistors. For example, in some embodiments, the first subset of the transistors may be formed at a first substrate, whereas the second subset of the transistors may be formed at one or more other substrates separate from the first substrate. The second subset of the transistors may not be electrically connected with the FD directly. Instead, the second subset of the transistors may be electrically connected with the first subset of the transistors via one or more connections (e.g., 3D electrical contacts) between the first substrate and the second substrate, and through the first subset of the transistors, the second subset of the transistors may then get connected with the FD.

In some embodiments, since the first subset of the transistors is directly connected with the FD, the FD may be considered to be formed collectively by these transistors at the electrical connection or junction point. Thus, placing these components close to each other, e.g., on the same substrate, may reduce the parasitic capacitance, e.g., the ground capacitance, along the electrical routing between the transistors and the FD, thus decreasing the capacitance of the FD. On the other hand, since the second subset of the transistors may not be connected with the FD node directly, placing these transistors at a separate substrate(s) may increase the distance between these transistors and the FD, reducing the capacitive coupling and thus the capacitance of the FD. As a result, use of the separate substrates to place the components may reduce the total FD capacitance and increase the conversion gain of the image sensor. One with skills in the art shall understand that an image sensor with the disclosed design can have several benefits. For example, as described above, the increase of the conversion gain can boost the sensor output image signals in low light conditions but also increase the signal-to-noise ratio (SNR). This can lead to improvement of the quality of the captured images. In addition, as the FD capacitance is reduced, it is possible to include more pixels in an image sensor to realize a higher solution but with a higher or same conversion gain.

FIG. 1 is a diagram showing example components of an individual pixel of an image sensor formed or fabricated on or within a plurality of substrates, according to some embodiments. As shown in FIG. 1, in some embodiments, pixel 100 may include PD 110, FD 112, and a pixel readout circuit. When exposed to light, PD 110 may generate and accumulate electrical charge, such as photoelectrons. In some embodiments, the pixel readout circuit may include a plurality of transistors, such as transfer gate transistor (hereinafter "TG") 114, source follower transistor (hereinafter "SF") 116, dual conversion gain transistor (hereinafter "DCG") 118 (which may be optional in some embodiments), reset transistor (hereinafter "RST") 120, and row select transistor (hereinafter "RS") 122. For purposes of illustration, in this example, the transistors are displayed as MOSFET devices. But they are only provided as an example. In some embodiments, the transistors may be implemented using any other appropriate types of semiconductor devices. As shown in FIG. 1, RST 120, RS 122, DCG 118, and TG 114 may be controlled respectively by control signals S1 140, S2 142, S3 144, and S4, 146, whereas SF 116 may be controlled by the voltage at FD 112. For example, asserting a control signal applied to the gate of a transistor to a logic high voltage may turn on the transistor, whereas de-asserting the control signal to a logic low voltage may turn off the transistor. In FIG. 1, VDD and VSS respectively represent an analog supply voltage and an analog ground.

For purposes of illustration, the schematic diagram of the corresponding electrical circuit of pixel 100 is also provided at the bottom of the figure. As shown in FIG. 1, in some embodiments, TG 114 may be selectively turned on to connect PD 110 with FD 112. When DCG 118 is turned on, RST 120 may be selectively turned on to connect FD 112 with VDD, so as to reset the voltage at FD 112 to VDD. The gate of SF 116 is connected to FD 112, and RS 112 may be selectively turned on to connect the source of SF 116 to pixel output line (hereinafter "output") 130, such that the voltage at FD 112 may be accessed and read out through output 130. In some embodiments, SF 116 may function as a voltage buffer. When RS 122 is turned on, SF 116 may provide a buffer between the voltage at FD 112 and the voltage at output 130. In some embodiments, DCG 118 may be selectively turned on or off to adjust the conversion gain of the charge-to-analog image signals conversion of pixel 100. For example, in some embodiments, turning on of DCG 118 may lower the conversion gain associated with the analog image signal of pixel 100, whereas turning off of DCG 118 may increase the conversion gain.

In some embodiments, at each readout, the analog image signal of pixel 100 may be sampled twice using correlated double sampling (CDS), a first sampling before transfer of electrical charge out of PD 110 and a second sampling after transfer of electrical charge out of PD 110. A difference between the two samplings may be determined and used as the final sample of the image signal of pixel 100 during this readout. For example, at readout, SF 116 and RS 122 may first be turned on to connect FD 112 with output 130. Next, DCG 118 and RST 120 may be turned on to reset the voltage of FD 112 to VDD. Next, the voltage of FD 112 may cause a voltage at output 130, which may be sampled using an analog-to-digital converter (not shown) outside the pixel readout circuit to generate the first sample of the image signal of pixel 100.

Still referring to FIG. 1, in some embodiments, RST 120 may next be turned off, and DCG 118 may stay on or be turned off depending on the required conversion gain. As described above, in some embodiments, turning on of DCG 118 may lower the conversion gain associated with the analog image signal of pixel 100, whereas turning off of DCG 118 may increase the conversion gain. Next, TG 114 may be turned on to connect PD 110 with FD 112. As a result, the electrical charge of PD 110 may transfer out of PD 110 to FD 112. In some embodiments, there may be capacitance C between FD 112 and ground VSS. Thus, the transfer of electrical charge may cause a current to flow through capacitance C and thus generate an analog image signal, such as the voltage, at FD 112. Since the voltage is generated by the transfer of charge onto capacitance C, e.g., V=q/C where q represents the amount of charge, the value of the voltage V may substantially be inversely proportional to the value of the capacitance C at FD 112. Thus, as described above, decreasing the FD capacitance C may increase the conversion gain of pixel 100 (e.g., to increase the value of the voltage with respect to a given amount of charge or signal carriers), whereas increasing the FD capacitance C may lower the conversion gain of pixel 100 (e.g., to lower the value of the voltage with respect to a given amount of charge or signal carriers). Similarly, the voltage of FD 112 may cause a voltage at output 130, which again may be sampled using the analog-to-digital converter to generate the second sample of the image signal of pixel 100. The difference between the two samples may be calculated, e.g., to subtract the first sample from the second sample to cancel out the reset voltage VDD, to obtain the final digital image signal of pixel 100. As described above, in some embodiments, after readout of pixels of the image sensor, the digital image signals of the pixels may be transferred to one or more other devices, e.g., an image signal processor (ISP). The ISP may further process the digital image signals to produce one or more images.

As shown in FIG. 1, in some embodiments, the above described components of pixel 100 may be formed or fabricated on or within a plurality of substrates, e.g., a $1^{st}$ substrate 102 and a $2^{nd}$ substrate 104. In some embodiments, the $1^{st}$ substrate 102 and $2^{nd}$ substrate 104 may be stacked together, e.g., one substrate placed on top of another. In some embodiments, the $1^{st}$ substrate 102 may be electrically connected with the $2^{nd}$ substrate 104 via one or more three-dimensional (3D) electrical contacts 106, e.g., electrical contacts vertically placed on the substrates. For example, with 3D electrical contacts 106, DCG 118 (at the $1^{st}$ substrate 102) may be electrically connected with RST 120 (at the $2^{nd}$ substrate 104), SF 116 (at the $1^{st}$ substrate 102) may be electrically connected with RS 122 (at the $2^{nd}$ substrate 104), etc. As shown in FIG. 1, since TG 114, SF 116, and DCG 118 are directly connected with FD 112, FD 112 may be considered to be formed collectively by these transistors at the electrical connection or junction point, as illustrated by the dashed circle. Thus, as shown in FIG. 1, in some embodiments, FD 112, TG 114, SF 116, and DCG 118 may be placed at the same substrate, e.g., the $1^{st}$ substrate 102. As described above, the close placement may reduce the lengths of electrical routing between these transistors and FD 112. This may reduce the parasitic capacitance along the routing, e.g., ground capacitance, which contributes to the total capacitance C of FD 112. Further, as shown in FIG. 1, in some embodiments, PD 110 may be placed together with FD 112, TG 114, SF 116, and DCG 118 at the same $1^{st}$ substrate 102.

On the other hand, in this example, RST 120 and RS 122 may not be connected with FD 112 directly. For example, RST 120 and RS 122 may be electrically connected with DCG 118 and SF 116 respectively via 3D electrical contacts 106, and through DCG 118 and SF 116 may then get connected with FD 112. Thus, as shown in FIG. 1, in some embodiments, RST 120 and RS 122 may be placed at one or more other substrates, e.g., the $2^{nd}$ substrate 104, that are separate from the $1^{st}$ substrate 102. As described above, the separate placement may increase the distance of RST 120 and RS 122 with respect to FD 112. This may reduce the capacitive coupling that contributes to the total capacitance C of FD 112. As a result, the above described placement of the components at the separate substrates may reduce the total capacitance C of FD 112 and increase the conversion gain associated with the output image signal of pixel 100. Once the conversion gains of individual pixels are increased, the overall conversion gain of the image sensor may be raised accordingly.

As described above, in some embodiments, DCG 118 may be an optional component. In some embodiments, pixel 100 may not necessarily include DCG 118, and RST 120 may be electrically connected with FD 112 directly. As a result, pixel 100 may become a single conversion gain pixel, rather than the above described dual conversion gain pixel. In this case, since RST 120 is directly connected with FD 112, RST 120 may be placed at the same substrate (e.g., the $1^{st}$ substrate 102) as FD 112, TG 114, and SF 116, whereas RS 122 may be placed at a separate substrate (e.g., the $2^{nd}$ substrate 104).

Note that FIG. 1 is provided only as an example for purposes of illustration. In some embodiments, an image sensor may include more than two substrates, and the above described components of pixel 100 may accordingly be placed across these multiple substrates. For example, in some embodiments, PD 110, FD 112, TG 114, SF 116, and DCG 118 may be placed at the $1^{st}$ substrate 102, RST 120 may be placed at the $2^{nd}$ substrate 104, and RS 122 may be placed at a $3^{rd}$ substrate. Also, in some embodiments, pixel 100 may include more than one PD 110. For example, in some embodiments, pixel 100 may include two or four PDs 110 to share the same FD 112. In this case, pixel 100 may include two or four corresponding TGs 114, each of which may be controlled to connect one corresponding one of PDs 110 with the shared FD 112. In this case, the multiple PDs and their associated TGs may be placed with the subset of transistors of the pixel readout circuit that is directly connected with the shared FD at the same substrate, whereas the rest of the transistors may be placed at one or more other substrates. In addition, in some embodiments, an image sensor may include a plurality of pixels 100, and these pixels 100 may share the plurality of substrates. For example, in some embodiments, the respective PDs 110, FDs 112, TGs 114, SFs 116, and DCGs 118 of individual pixels may be formed at the $1^{st}$ substrate 102, wherein the respective RSTs 120 and RS's 122 of the individual pixels may be formed at the $2^{nd}$ substrate 104.

Figure 2:
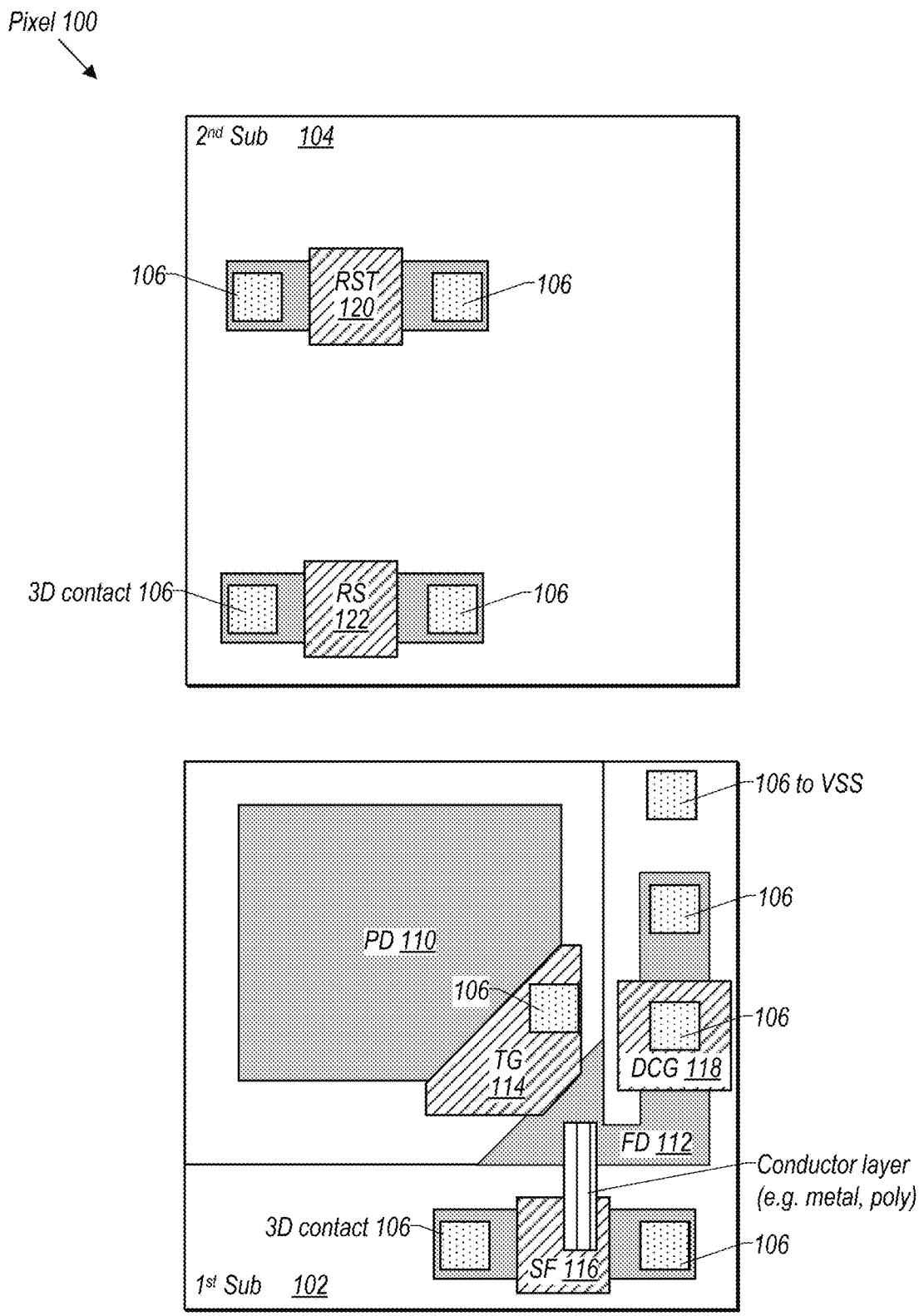
FIG. 2 shows an example layout of an individual pixel of an image sensor formed or fabricated on or within a plurality of substrates, according to some embodiments.

FIG. 2 shows an example layout of an individual pixel of an image sensor formed or fabricated on or within a plurality of substrates, according to some embodiments. As described above, in some embodiments, the plurality of substrates may be stacked together. However, for purposes of illustration, in this figure the substrates are placed side-by-side to provide a top view of the layout. As shown in FIG. 2, in some embodiments, PD 110, FD 112, TG 114, SF 116, and DCG 118 of pixel 100 may be placed at the $1^{st}$ substrate 102, whereas RST 1202 and RS 122 may be formed on or within the $2^{nd}$ substrate 104. Further, the $1^{st}$ substrate 102 and $2^{nd}$ substrate 104 may each include one or more 3D electrical contacts 106, via through the $1^{st}$ substrate 102 may be electrically connected with the $2^{nd}$ substrate 104, e.g., one on top of another by stacking together. In addition, as shown in FIG. 2, in some embodiments, an electrical contact 106 may be formed at the (polycrystalline silicon (polysilicon) or metal) gate of a transistor, e.g., the electrical contact(s) 106 at the gate of DCG 118 and/or the gate of TG 114. In some embodiments, an electrical contact 106 may be formed directly on a substrate surface, e.g., the electrical contact 3D connected to VSS. In some embodiments, 3D electrical contacts 106 may be formed with metal, polysilicon, and/or other conductive materials. For purposes of illustration, FIG. 2 also shows a conductor layer to implement the electrical routing between SF 116 and FD 112, which is also shown in FIG. 1. Conductor layers like this which connect the components of pixel 100 may be formed with metal, polysilicon, and/or other conductive materials.

Figure 3:
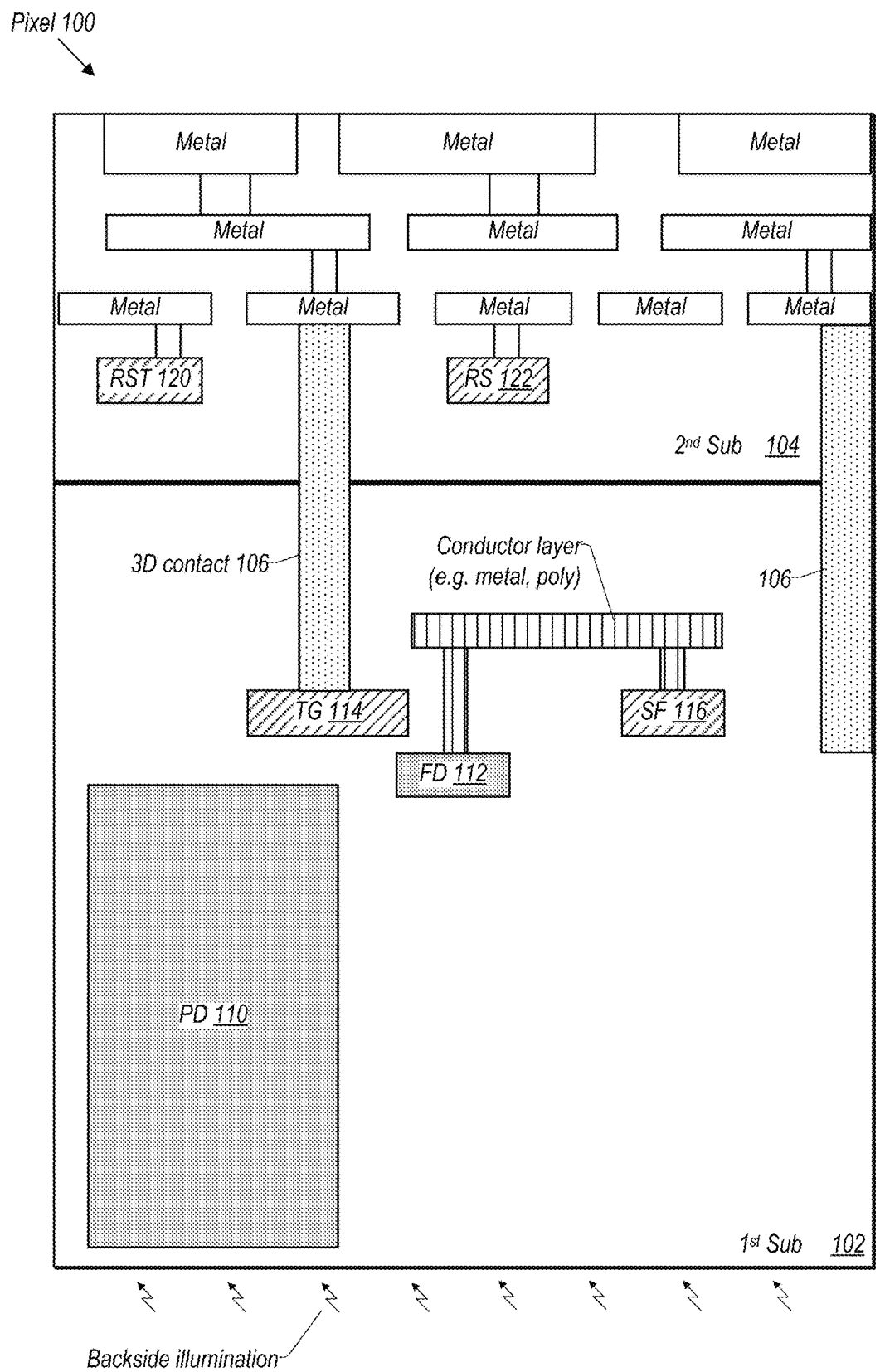
FIG. 3 shows an example cross-section view of an individual pixel of an image sensor formed or fabricated on or within a plurality of substrates, according to some embodiments.

FIG. 3 shows an example cross-section view of an individual pixel of an image sensor formed or fabricated on or within a plurality of substrates, according to some embodiments. As shown in FIG. 3, the $1^{st}$ substrate 102 and $2^{nd}$ substrate 104 may be stacked. In this example, the $1^{st}$ substrate 102 may be placed underneath the $2^{nd}$ substrate 104. Further, the $1^{st}$ substrate 102 and $2^{nd}$ substrate 104 may be electrically connected with each other via 3D electrical contacts 106. As shown in FIG. 3, 3D electrical contacts 106 may be placed vertically at the $1^{st}$ substrate 102 and $2^{nd}$ substrate 104 for implementing the stack-up of the substrates. Also, as shown in FIG. 3, in this example, PD 110, FD 112, TG 114, SF 116, and DCG 118 may be placed at the $1^{st}$ substrate 102, whereas RST 1202 and RS 122 may be placed at the $2^{nd}$ substrate 104. Also, for comparison with FIGS. 1-2, the conductor layer between SF 116 and FD 112 is also shown in FIG. 3. For purposes of illustration, FIG. 3 also shows some metal conductor layers within the $2^{nd}$ substrate 104 for making electrical connections with respect to some components of pixel 100. In this example, since the $1^{st}$ substrate 102 is placed underneath the $2^{nd}$ substrate 104, pixel 100 may receive light from the backside (e.g., backside illumination), as shown in FIG. 3. But note that this is provided only as an example for purposes of illustration. In some embodiments, the substrates may be configured in different spatial arrangements, such that the $1^{st}$ substrate 102 may receive light from the front side (e.g., front side illumination). Also, in some embodiments, the $1^{st}$ substrate 102 and $2^{nd}$ substrate 104 may or may not have the same width as shown in FIG. 3.

Figure 4:
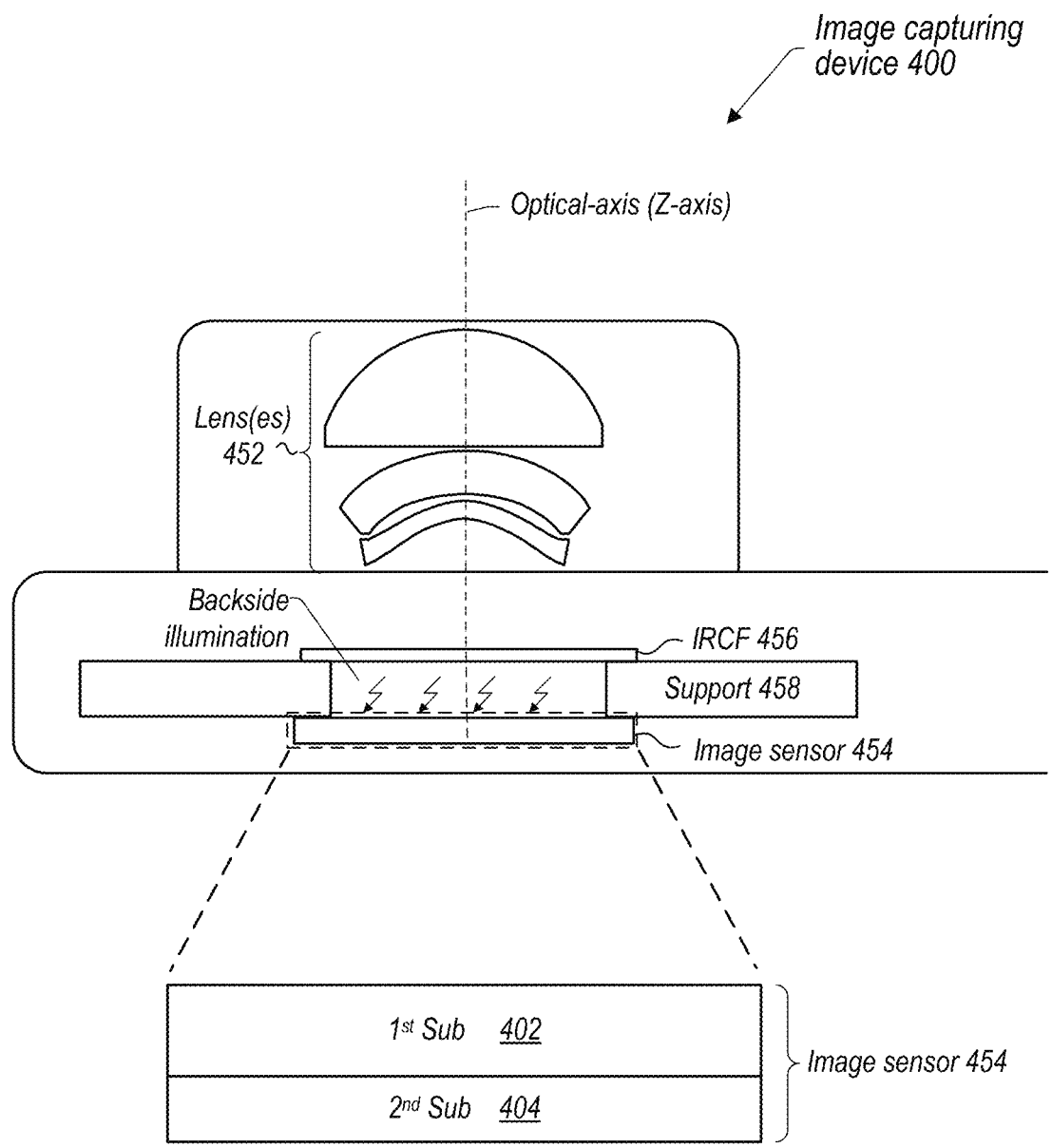
FIG. 4 shows an example image capturing device including an image sensor, according to some embodiments.

FIG. 4 shows an example image capturing device including an image sensor, according to some embodiments. As shown in FIG. 4, in some embodiments, image capturing device 400 (e.g., a camera) may include one or more lenses 452 and image sensor 454. Image capturing device 400 may capture light from an environment. The light may pass through lenses 452 to reach image sensor 454. As described above, in some embodiments, image sensor 454 may include a plurality of light-gathering pixels (e.g., similar to pixel 100 described above). When exposed to the light, the photodiodes of the pixels may accumulate electrical charge. Also, as shown in FIG. 4, in some embodiments, image capturing device 400 may include infrared cutoff filter (IRCF) 456 which may place optically between lenses 452 and image sensor 454 to prevent infrared light from reaching image sensor 454. As shown in FIG. 400, in some embodiments, image sensor 454 and IRCF 456 may be attached to support 458. In some embodiments, support 458 may be formed using one or more substrates. As shown in the zoomed view of image sensor 454, in some embodiments, image sensor 454 may include a plurality of substrates to form the components of the pixels, as described above. For purposes of illustration, the components of the pixels are not shown as they have been described in previous figures. As shown in FIG. 4, image sensor 454 may include a $1^{st}$ substrate 402 (e.g., similar to the $1^{st}$ substrate 102) and a $2^{nd}$ substrate 404 (e.g., similar to the $2^{nd}$ substrate 404). In some embodiments, the components of the individual pixels of image sensor 454 may be formed on or within the $1^{st}$ substrate 402 and $2^{nd}$ substrate 404, similar to what is described above. For example, in some embodiments, the respective PDs, FDs, TGs, SFs, and DCGs of the individual pixels may be formed at the 1$^{st}$ substrate 402, wherein the respective RSTs and RS's of the individual pixels may be formed at the 2$^{nd}$ substrate 404. Also, as shown in FIG. 4, in some embodiments, the two substrates may be stacked one on top of another. In this example, image sensor 454 may be attached to support 458 upside down for the 1$^{st}$ substrate 402 to be exposed to light via backside illumination. But FIG. 4 is provided only as an example for purposes of illustration, and image sensor 454 may be mounted to support 458 according to other configurations. For example, in some embodiments, image sensor 454 may be mounted upright (e.g., the 1$^{st}$ substrate 402 staying underneath the 2$^{nd}$ substrate 404), and the light may be guided via optic fiber(s) to illuminate the 1$^{st}$ substrate 402 from the backside of image sensor 454.

Figure 5:
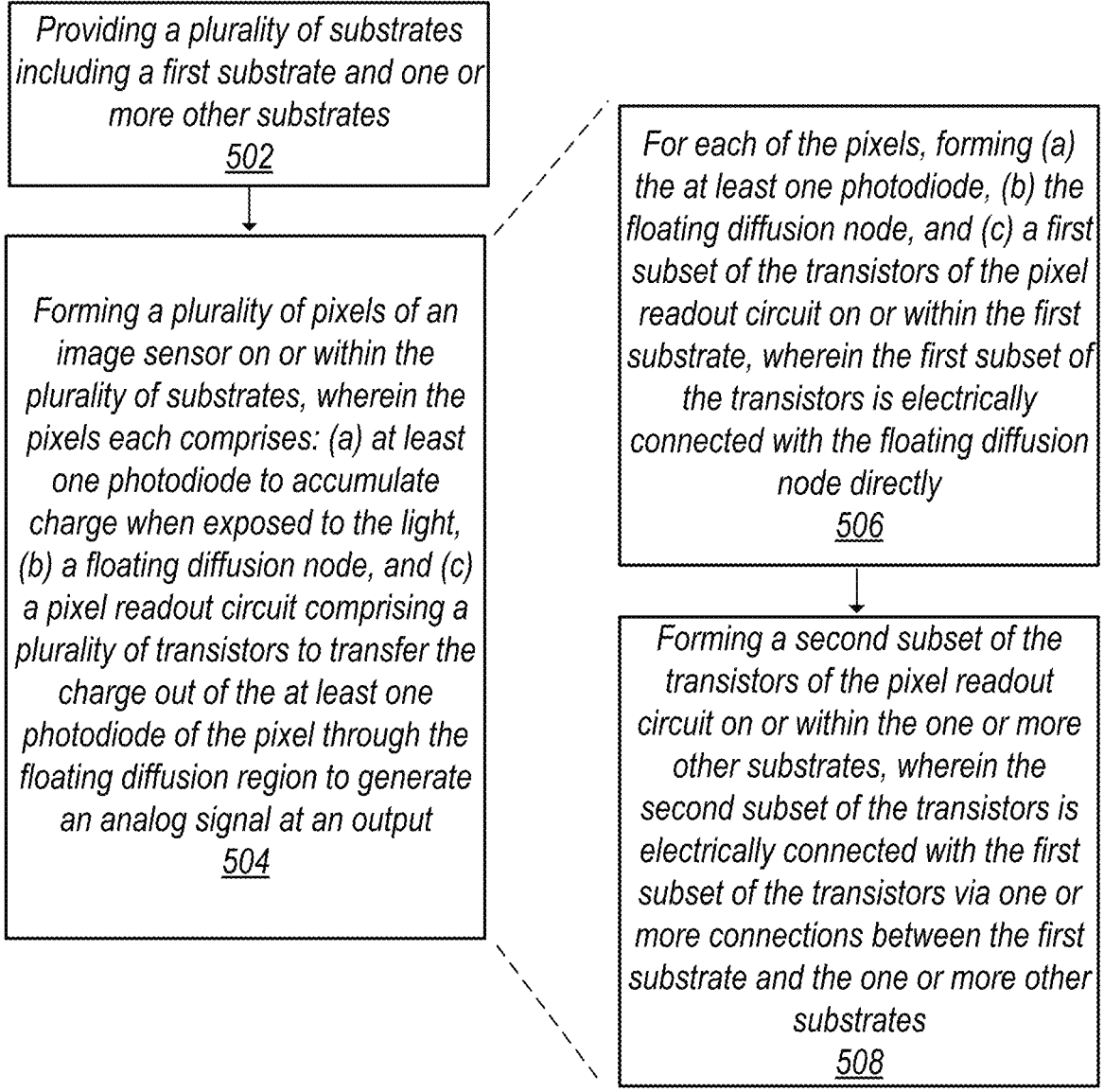
FIG. 5 is a flowchart showing an example method for fabricating an image sensor using a plurality of substrates, according to some embodiments.

FIG. 5 is a flowchart showing an example method for fabricating an image sensor using a plurality of substrates, according to some embodiments. As shown in FIG. 5, in some embodiments, a plurality of substrates may be provided for fabricating an image sensor (e.g., similar to the image sensors described above), and the plurality of substrates may include a first substrate and one or more other substrates, as shown in block 502. In some embodiments, a plurality of pixels of the image sensor may be formed on or within the plurality of substrates, as shown in block 504. In some embodiments, each of the pixels (e.g., similar to the pixels described above) may include (a) at least one photodiode, (b) a floating diffusion node, and (c) a pixel readout circuit having a plurality of transistors. In some embodiments, the pixel readout circuit (e.g., similar to the pixel readout circuits described above) may include a plurality of transistors to transfer electrical charge out of the at least one photodiode of the pixel throughout the floating diffusion node to generate an analog signal (e.g., an analog voltage) at an output (e.g., a pixel output line) of the pixel, as shown in block 504. In some embodiments, the formation of the pixels may include, for each pixel, forming (a) the at least one photodiode, (b) the floating diffusion node, and (c) a first subset of the transistors of the pixel readout circuit of the pixel on or within the first substrate, and the first subset of the transistors may be electrically connected with the floating diffusion node directly, as shown in block 506. In addition, in some embodiments, the formation of the pixels of the image sensor may further include, for each pixel, forming a second subset of the transistors of the pixel readout circuit on or within the one or more other substrates, and the second subset of the transistors may be electrically connected with the first subset of the transistors, e.g., via one or more connections (e.g., one or more 3D electrical contacts) between the first substrate and the one or more other substrates, as shown in block 508.

Figure 6:
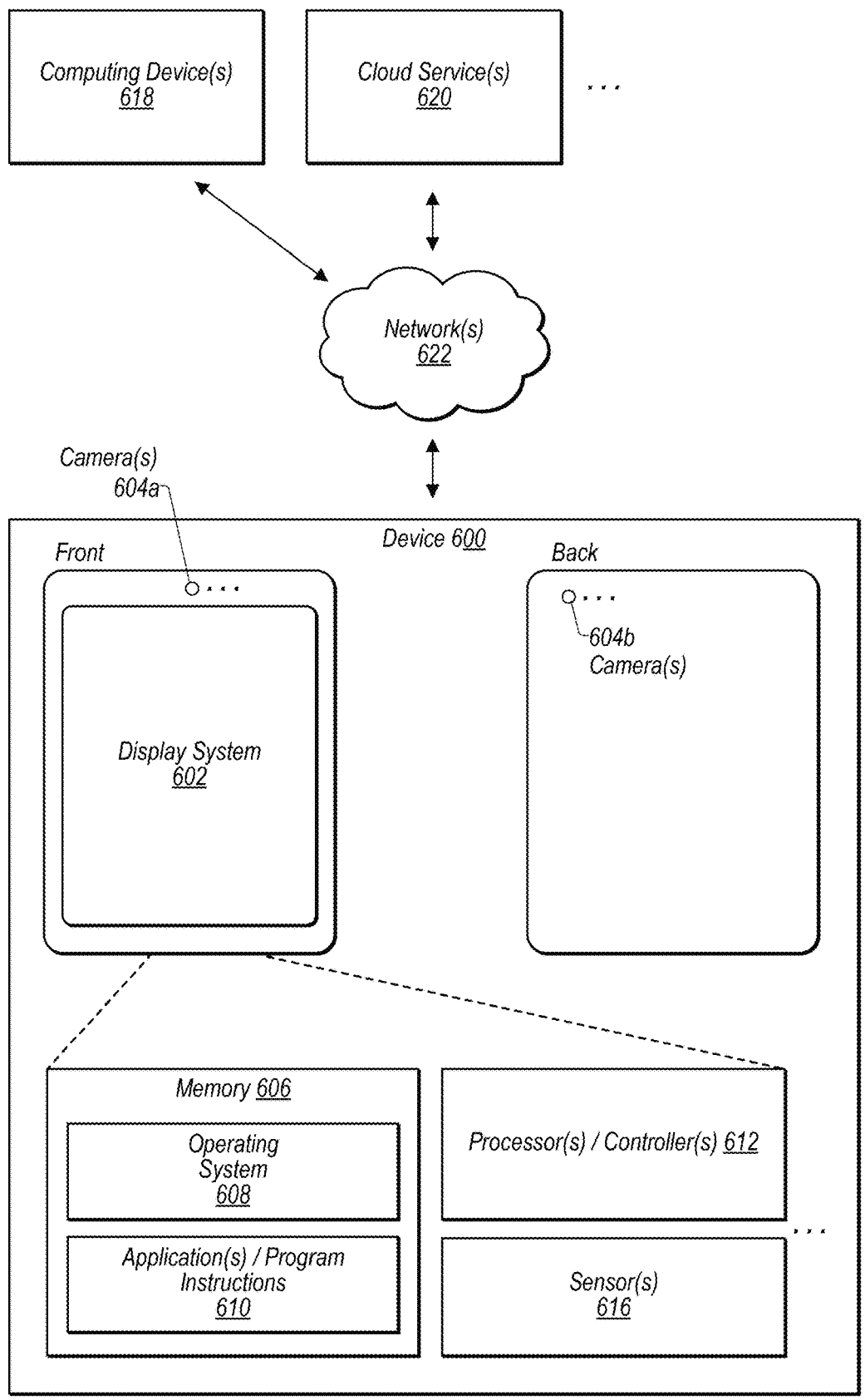
FIG. 6 illustrates a schematic representation of an example device that may include an image capturing device having an image sensor that includes a plurality of substrates, according to some embodiments.

FIG. 6 illustrates a schematic representation of an example device 600 that may include an image capturing device (e.g., a camera) having an image sensor that includes a plurality of substrates, as described above, according to some embodiments. In some embodiments, the device 600 may be a mobile device and/or a multifunction device. In various embodiments, the device 600 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In some embodiments, the device 600 may include a display system 602 (e.g., comprising a display and/or a touch-sensitive surface) and/or one or more cameras 604. In some non-limiting embodiments, the display system 602 and/or one or more front-facing cameras 604a may be provided at a front side of the device 600, e.g., as indicated in FIG. 6. Additionally, or alternatively, one or more rear-facing cameras 604b may be provided at a rear side of the device 600. In some embodiments comprising multiple cameras 604, some or all of the cameras may be the same as, or similar to, each other. Additionally, or alternatively, some or all of the cameras may be different from each other. In various embodiments, the location(s) and/or arrangement(s) of the camera(s) 604 may be different than those indicated in FIG. 6.

Among other things, the device 600 may include memory 606 (e.g., comprising an operating system 608 and/or application(s)/program instructions 610), one or more processors and/or controllers 612 (e.g., comprising CPU(s), memory controller(s), display controller(s), and/or camera controller(s), etc.), and/or one or more sensors 616 (e.g., orientation sensor(s), proximity sensor(s), and/or position sensor(s), etc.). In some embodiments, the device 600 may communicate with one or more other devices and/or services, such as computing device(s) 618, cloud service(s) 620, etc., via one or more networks 622. For example, the device 600 may include a network interface (e.g., network interface 810) that enables the device 600 to transmit data to, and receive data from, the network(s) 622. Additionally, or alternatively, the device 600 may be capable of communicating with other devices via wireless communication using any of a variety of communications standards, protocols, and/or technologies.

Figure 7:
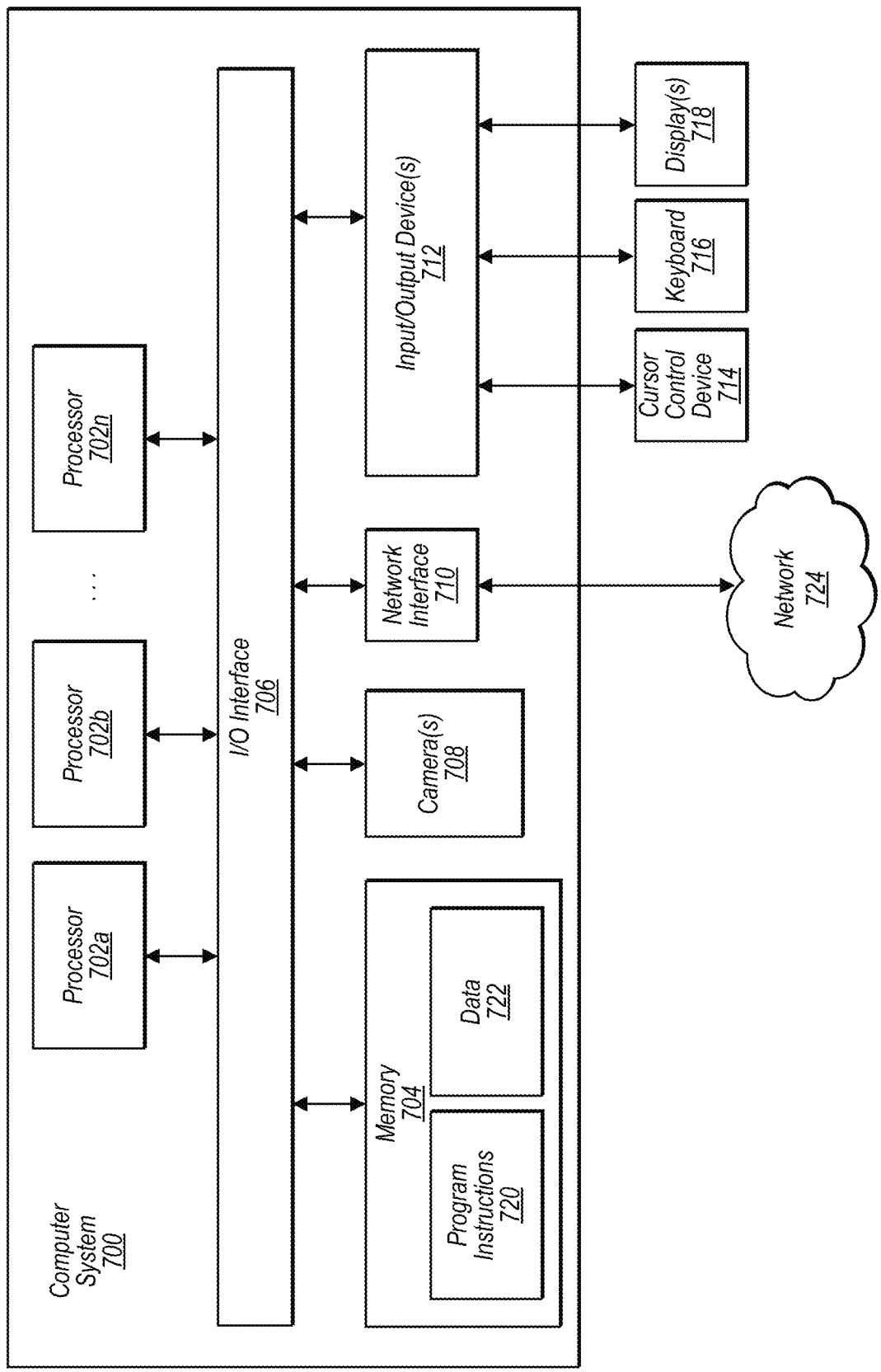
FIG. 7 illustrates a schematic block diagram of an example computing device that may include or host embodiments of an image capturing device having a plurality of substrates, according to some embodiments.

FIG. 7 illustrates a schematic block diagram of an example computing device, referred to as computer system 700, that may include or host embodiments of an image capturing device (e.g., a camera) having an image sensor that includes a plurality of substrates, as described above, according to some embodiments. In addition, computer system 700 may implement methods for controlling operations of the camera and/or for performing image processing images captured with the camera. In some embodiments, the device 700 (described herein with reference to FIG. 7) may additionally, or alternatively, include some or all of the functional components of the computer system 700 described herein.

The computer system 700 may be configured to execute any or all of the embodiments described above. In different embodiments, computer system 700 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In the illustrated embodiment, computer system 700 includes one or more processors 702 coupled to a system memory 704 via an input/output (I/O) interface 706. Computer system 700 further includes one or more cameras 708 coupled to the I/O interface 706. Computer system 700 further includes a network interface 710 coupled to I/O interface 706, and one or more input/output devices 712, such as cursor control device 714, keyboard 716, and display(s) 718. In some cases, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 702, or a multiprocessor system including several processors 702 (e.g., two, four, eight, or another suitable number). Processors 702 may be any suitable processor capable of executing instructions. For example, in various embodiments processors 702 may be general-purpose or embedded processors implementing any of a variety of instruction set architectures (ISAs), such as the x86, PowerPC, SPARC, or MIPS ISAs, or any other suitable ISA. Also, in some embodiments, one or more of processors 702 may include additional types of processors, such as graphics processing units (GPUs), application specific integrated circuits (ASICs), etc. In multiprocessor systems, each of processors 702 may commonly, but not necessarily, implement the same ISA. In some embodiments, computer system 700 may be implemented as a system on a chip (SoC). For example, in some embodiments, processors 702, memory 704, I/O interface 706 (e.g. a fabric), etc. may be implemented in a single SoC comprising multiple components integrated into a single chip. For example, an SoC may include multiple CPU cores, a multi-core GPU, a multi-core neural engine, cache, one or more memories, etc. integrated into a single chip. In some embodiments, an SoC embodiment may implement a reduced instruction set computing (RISC) architecture, or any other suitable architecture.

System memory 704 may be configured to store program instructions 720 accessible by processor 702. In various embodiments, system memory 704 may be implemented using any suitable memory technology, such as static random access memory (SRAM), synchronous dynamic RAM (SDRAM), nonvolatile/Flash-type memory, or any other type of memory. Additionally, existing camera control data 722 of memory 704 may include any of the information or data structures to implement the design and/or techniques described above. In some embodiments, program instructions 720 and/or data 722 may be received, sent or stored upon different types of computer-accessible media or on similar media separate from system memory 704 or computer system 700. In various embodiments, some or all of the functionality described herein may be implemented via such a computer system 700.

In one embodiment, I/O interface 706 may be configured to coordinate I/O traffic between processor 702, system memory 704, and any peripheral devices in the device, including network interface 710 or other peripheral interfaces, such as input/output devices 712. In some embodiments, I/O interface 706 may perform any necessary protocol, timing or other data transformations to convert data signals from one component (e.g., system memory 704) into a format suitable for use by another component (e.g., processor 702). In some embodiments, I/O interface 706 may include support for devices attached through various types of peripheral buses, such as a variant of the Peripheral Component Interconnect (PCI) bus standard or the Universal Serial Bus (USB) standard, for example. In some embodiments, the function of I/O interface 706 may be split into two or more separate components, such as a north bridge and a south bridge, for example. Also, in some embodiments some or all of the functionality of I/O interface 706, such as an interface to system memory 704, may be incorporated directly into processor 702.

Network interface 710 may be configured to allow data to be exchanged between computer system 700 and other devices attached to a network 724 (e.g., carrier or agent devices) or between nodes of computer system 700. Network 724 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 710 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 712 may, in some embodiments, include one or more display terminals, keyboards, keypads, touchpads, scanning devices, voice or optical recognition devices, or any other devices suitable for entering or accessing data by one or more computer systems 700. Multiple input/output devices 712 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 710.

Those skilled in the art will appreciate that computer system 700 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. An image sensor, comprising:
   a plurality of pixels; and
   a plurality of substrates comprising a first substrate and one or more other substrates,
   wherein at least some of the pixels each comprises:
      at least one photodiode configured to accumulate charge when exposed to light;
      a floating diffusion node; and
      a pixel readout circuit comprising a plurality of transistors configured to transfer the charge out of the at least one photodiode of the pixel through the floating diffusion region to generate an analog signal at an output,
   wherein the at least one photodiode, floating diffusion node, and pixel readout circuit are formed on or within the plurality of substrates, such that the first substrate comprises:
      the at least one photodiode;
      the floating diffusion node; and
      a first subset of the transistors of the pixel readout circuit that is electrically connected with the floating diffusion node directly, and
   the one or more other substrates comprise:
      a second subset of the transistors of the pixel readout circuit that is electrically connected with the first subset of the transistors of the pixel readout circuit via one or more connections between the first substrate and the one or more other substrates.

2. The image sensor of claim 1, wherein the first subset of the transistors comprises:
   a transfer gate transistor configured to connect the at least one photodiode with the floating diffusion node; and
   a source follower transistor configured to provide a voltage buffer between an analog signal at the floating diffusion node and the analog signal at the output.

3. The image sensor of claim 2, wherein the first subset of the transistors further comprises:
   a conversion gain transistor configured to adjust a conversion gain associated with the analog signal of the at least one pixel.

4. The image sensor of claim 3, wherein the second subset of the transistors comprises:
   a reset transistor configured to reset an analog signal at the floating diffusion node to a reset value; and
   a row select transistor configured to connect the floating diffusion node with the output of the pixel.

5. The image sensor of claim 2, wherein the first subset of the transistors further comprises:
   a reset transistor configured to reset an analog signal at the floating diffusion node to a reset value.

6. The image sensor of claim 5, wherein the second subset of the transistors comprises:
   a row select transistor configured to connect the floating diffusion node with the output of the pixel.

7. The image sensor of claim 1, wherein the at least some pixels share the plurality of substrates, such that the first substrate comprises respective photodiodes, floating diffusion nodes, and first subsets of transistors of individual ones of the at least some pixels and the one or more other substrates comprise respective second subsets of transistors of the individual pixels.

8. The image sensor of claim 1, wherein the at least some pixels each comprises multiple photodiodes configured to share the floating diffusion node, such that the multiple photodiodes are connected with the shared floating diffusion node via respective transfer gate transistors.

9. The image sensor of claim 1, wherein the first substrate is placed on top of or underneath the one or more other substrates.

10. The image sensor of claim 1, wherein the one or more connections between the first substrate and the one or more other substrates comprise one or more 3D electrical contacts.

11. A system, comprising:
    one or more lenses;
    an image sensor configured to receive light having passed through the lenses, wherein the image sensor comprises:
       a plurality of pixels; and
       a plurality of substrates comprising a first substrate and one or more other substrates,
       wherein at least some of the pixels each comprises:
          at least one photodiode configured to accumulate charge when exposed to the light;
          a floating diffusion node; and
          a pixel readout circuit comprising a plurality of transistors configured to transfer the charge out of the at least one photodiode of the pixel through the floating diffusion region to generate an analog signal at an output, wherein the at least one photodiode, floating diffusion node, and pixel readout circuit are formed on or within the plurality of substrates, such that the first substrate comprises:
the at least one photodiode;
the floating diffusion node; and
a first subset of the transistors of the pixel readout circuit that is electrically connected with the floating diffusion node directly, and
the one or more other substrates comprise:
a second subset of the transistors of the pixel readout circuit that is electrically connected with the first subset of the transistors of the pixel readout circuit via one or more connections between the first substrate and the one or more other substrates.

12. The system of claim 11, wherein the first subset of the transistors comprises:
a transfer gate transistor configured to connect the at least one photodiode with the floating diffusion node; and
a source follower transistor configured to provide a voltage buffer between an analog signal at the floating diffusion node and the analog signal at the output.

13. The system of claim 12, wherein the first subset of the transistors further comprises:
a conversion gain transistor configured to adjust a conversion gain associated with the analog signal of the at least one pixel.

14. The system of claim 13, wherein the second subset of the transistors comprises:
a reset transistor configured to reset an analog signal at the floating diffusion node to a reset value; and
a row select transistor configured to connect the floating diffusion node with the output of the pixel.

15. The system of claim 12, wherein the first subset of the transistors further comprises:
a reset transistor configured to reset an analog signal at the floating diffusion node to a reset value.

16. The system of claim 15, wherein the second subset of the transistors comprises:
a row select transistor configured to connect the floating diffusion node with the output of the pixel.

17. The system of claim 11, wherein the at least some pixels share the plurality of substrates, such that the first substrate comprises respective photodiodes, floating diffusion nodes, and first subsets of transistors of individual ones of the at least some pixels and the one or more other substrates comprise respective second subsets of transistors of the individual pixels.

18. A device, comprising:
a camera comprising:
one or more lenses;
an image sensor configured to receive light having passed through the lenses,
wherein the image sensor comprises:
a plurality of pixels; and
a plurality of substrates comprising a first substrate and one or more other substrates,
wherein at least some of the pixels each comprises:
at least one photodiode configured to accumulate charge when exposed to the light;
a floating diffusion node; and
a pixel readout circuit comprising a plurality of transistors configured to transfer the charge out of the at least one photodiode of the pixel through the floating diffusion region to generate an analog signal at an output,
wherein the at least one photodiode, floating diffusion node, and pixel readout circuit are formed on or within the plurality of substrates, such that the first substrate comprises:
the at least one photodiode;
the floating diffusion node; and
a first subset of the transistors of the pixel readout circuit that is electrically connected with the floating diffusion node directly, and
the one or more other substrates comprise:
a second subset of the transistors of the pixel readout circuit that is electrically connected with the floating diffusion node indirectly via the first subset of the transistors; and
an image signal processor configured to generate one or more images based at least in part on the analog signals of the pixels of the image sensor.

19. The device of claim 18, wherein the first subset of the transistors comprises:
a transfer gate transistor configured to connect the at least one photodiode with the floating diffusion node; and
a source follower transistor configured to provide a voltage buffer between an analog signal at the floating diffusion node and the analog signal at the output.

20. The device of claim 18, wherein the second subset of the transistors comprises:
a row select transistor configured to connect the floating diffusion node with the output of the pixel.

* * * * *